United States Patent [19]

Hale

[11] 4,258,790

[45] Mar. 31, 1981

[54] WELL CEMENTING METHOD USING LOW FLUID-LOSS CEMENT SLURRY

[75] Inventor: Billy W. Hale, Aledo, Tex.

[73] Assignee: The Western Company of North America, Fort Worth, Tex.

[21] Appl. No.: 5,954

[22] Filed: Jan. 24, 1979

[51] Int. Cl.$^3$ .............................................. E21B 33/14
[52] U.S. Cl. ..................................... 166/293; 106/93; 166/283
[58] Field of Search ............... 166/282, 283, 292, 293; 106/93

[56] References Cited

U.S. PATENT DOCUMENTS

| | | | |
|---|---|---|---|
| 2,233,974 | 3/1941 | Dunn | 166/292 |
| 2,646,360 | 7/1953 | Lea | 166/293 X |
| 2,779,417 | 1/1957 | Clark et al. | 166/293 |
| 2,790,724 | 4/1957 | Bergman | 166/293 X |
| 2,881,142 | 4/1959 | Eldridge | 260/17 R |
| 2,965,171 | 12/1960 | Howard et al. | 166/292 |
| 3,132,693 | 5/1964 | Weisend | 166/293 |
| 3,359,225 | 12/1967 | Weisend | 106/93 X |
| 3,483,007 | 12/1969 | Hook | 166/292 X |
| 3,614,634 | 10/1952 | Lea | 166/293 |
| 3,662,830 | 5/1972 | Martin | 166/293 |

Primary Examiner—Stephen J. Novosad
Assistant Examiner—George A. Suchfield

[57] ABSTRACT

An improved fluid loss additive for use in well cements, preferably comprising from about 30 to about 70 weight percent polyvinylpyrrolidone, from about 5 to about 19 weight percent carboxymethylhydroxyethyl cellulose, and the sodium salt of naphthalene sulfonate. Improved cement slurries comprising the subject fluid loss additive and an improved method for cementing well bores through use of the novel slurries are also provided. The improved cement slurries of the invention preferably comprise from about 26 to about 60 percent water and from about 0.75 to about 2 percent of the improved fluid loss additive, by weight of the cement.

14 Claims, 3 Drawing Figures

WELL CEMENTING METHOD USING LOW FLUID-LOSS CEMENT SLURRY

BACKGROUND OF THE INVENTION

This invention relates to cement slurries utilized in subterranean wells. One aspect of the invention relates to cement slurries comprising cement, water, and a novel fluid loss additive. A further aspect of the invention relates to a fluid loss additive preferably comprising polyvinylpyrrolidone, carboxymethylhydroxyethyl cellulose, and the sodium salt of naphthalene sulfonate.

In the drilling, completion and servicing of subterranean wells, it is customary to utilize cement or concrete slurries for the purpose of sealing various portions of the well bore, for anchoring well pipe or well casing therein, and for other well known and established purposes. The cement slurry is usually pumped into the well bore under considerable pressure, where it is further subjected to the hydrostatic pressure of the column of fluid which may extend for several thousand feet. The slurry is also subjected to elevated temperatures that usually increase in proportion to the depth of the well.

Because of the widely varying soil formations and operating conditions that may be encountered in drilling and completing different wells, or even at different stages within a single well, additives are frequently utilized in cement slurries in order to achieve certain desired properties. For example, accelerators or retarders are often added to affect the setting time of the cement, thereby varying its ultimate hardness or strength. Fluid loss additives are also frequently employed in cement slurries when working within permeable formations or water sensitive zones where fluid loss control is necessary. However, conventional fluid loss additives have exhibited numerous disadvantages. Many conventional fluid loss additives are loaded with cellulose type materials and tend to greatly increase the viscosities of the slurries in which they are employed. Others are strong retarders and hinder the development of good early compressive strengths. Conventional fluid loss additives representative of those described in the prior art are disclosed in U.S. Pat. No. 2,247,683 to Ludwig, U.S. Pat. No. 3,132,693 to Weisen, and U.S. Pat. No. 3,140,269 to Wahl, et al.

An effective fluid loss additive is therefore needed that can maintain the viscosity of a cement slurry at a level comparable to that of neat cement. Furthermore, cement slurries containing the improved fluid loss additive should be readily pumpable across weak, sensitive zones where slurry fluid loss must be controlled or where annular space is restricted, and should be able to develop high early compressive strengths at bottom hole circulating temperatures as high as 215° F. (102° C.) or above.

SUMMARY OF THE INVENTION

According to the present invention, an improved fluid loss additive is provided that develops good fluid loss control at bottom hole circulating temperatures ranging from about 80° to about 215° F. (27°–102° C.) or above without appreciably increasing the viscosity of the cement slurries in which it is employed. The novel fluid loss additive of the invention preferably comprises from about 30 to about 70 weight percent polyvinylpyrrolidone, from about 5 to about 19 weight percent carboxymethylhydroxyethyl cellulose, and the sodium salt of naphthalene sulfonate.

According to another embodiment of the invention, an improved cement slurry is provided that preferably comprises cement, from about 26 to about 60 percent water, and from 0.75 to about 2 percent of the fluid loss additive of the invention, by weight of the cement. The subject slurry is easily and quickly mixed and exhibits low viscosity, even when the novel fluid loss additive is used at relatively high concentrations.

When employed according to the method of the invention, the improved slurries disclosed herein provide excellent fluid loss control, permit faster pumping rates without excessive pressure differentials across the formation face, and develop high early compressive strengths.

DETAILED DESCRIPTION OF THE INVENTION

Figure 1:
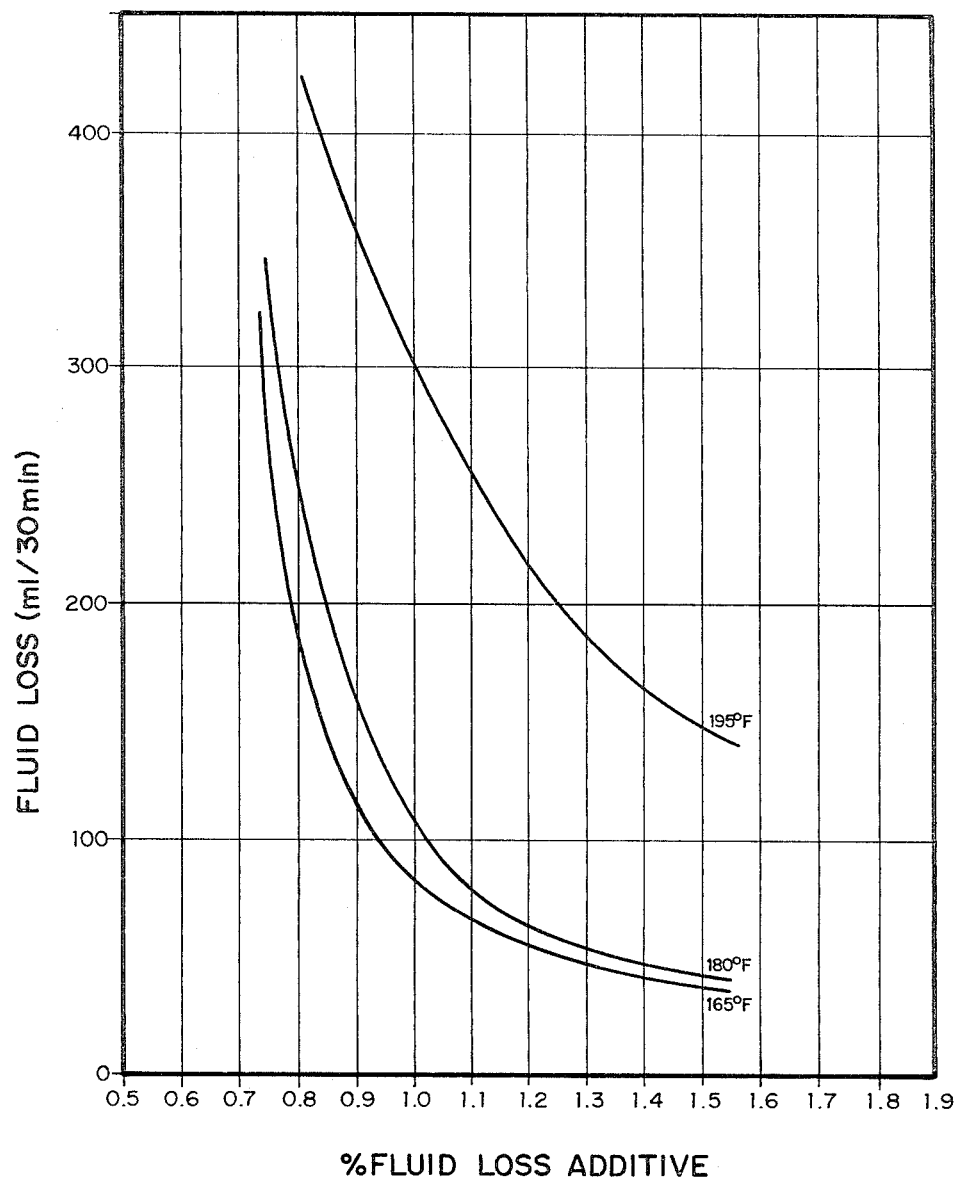
FIG. 1 demonstrates a decrease in fluid loss achieved with increasing concentration of additive at various constant temperatures.

The improved fluid loss additive of the invention preferably comprises from about 30 to about 70 weight percent polyvinylpyrrolidone, from about 5 to about 19 weight percent carboxymethylhydroxyethyl cellulose, and the remainder of the sodium salt of naphthalene sulfonate. Most preferably, the subject fluid loss additive comprises about 50 weight percent polyvinylpyrrolidone, about 9 weight percent carboxymethylhydroxyethyl cellulose, and about 41 weight percent of the sodium salt of naphthalene sulfonate.

Polyvinylpyrrolidone is a white, free-flowing powder that is dispersible in water. The polyvinylpyrrolidone selected for use in the present invention will preferably have an average molecular weight of about 40,000. A satisfactory polyvinylpyrrolidone is commercially available under the tradename PVP K-30 from General Aniline & Film Corporation.

The preferred cellulose component for use in the improved fluid loss additive of the invention is carboxymethylhydroxyethyl cellulose. Although the conventional fluid loss additives disclosed in the prior art have typically contained a cellulose component, it has now been discovered that the use of carboxymethylhydroxyethyl cellulose together with polyvinylpyrrolidone and the sodium salt of naphthalene sulfonate within the ranges disclosed herein produces significantly improved results in comparison with the conventional compositions. The carboxymethylhydroxyethyl cellulose component will preferably have an average molecular weight ranging from about two hundred thousand to about seven hundred thousand and a molecular substitution ranging from about 2.0 to about 2.5. A satisfactory carboxymethylhydroxyethyl cellulose for use in the present invention is marketed by Hercules Incorporated under the tradename SPX-5323.

The sodium salt of naphthalene sulfonate functions as a dispersant in the novel fluid loss additive of the invention. Preferably, the dispersant is the sodium salt of naphthalene sulfonate condensed with formaldehyde and has an average molecular weight of about 1500. A satisfactory sodium salt of naphthalene sulfonate for use as a dispersant in the invention is a commercially available powder marketed by The Western Company of North America under the tradename TF-4. Other preferred dispersants include Daxad 19 marketed by W. R. Grace & Co. and Lomar D marketed by Diamond Shamrock Corp.

To form the fluid loss additive of the invention, the polyvinylpyrrolidone, dispersant, and cellulose components are admixed and blended through the use of any of the well known means available to those of ordinary skill in the art. According to a preferred embodiment of the invention, the three components are blended in a standard barrel-type roller to achieve thorough mixing. Other mixing or blending devices that are similarly effective include ribbon blenders, vee blenders and double-cone blenders. The blended mixture of polyvinylpyrrolidone, dispersant, and cellulose can then be added to the dry cement for thorough admixture therewith prior to forming the cement slurry of the invention.

The improved cement slurries of the invention comprise cement, water, and the improved fluid loss additive disclosed above. According to a preferred embodiment, the subject slurries comprise from about 26 to about 60 percent water and from 0.75 to 2.0 percent fluid loss additive, by weight of the cement. Most preferably, the slurries comprise from about 38 to about 48 percent water and from about 1 to about 1.5 percent fluid loss additive, by weight of the cement.

A preferred cement for use in the cement slurries disclosed herein is Portland cement. Preferably, the cement slurries are not formulated with lightweight cement. However, mixtures of Portland cement and lightweight cement (also referred to as talc) have proven effective within the scope of the invention. Lightweight cements tend to be ground more finely, and therefore require more water to maintain a viscosity that will render the resulting slurry readily pumpable. Almost any potable water will function well when used in the cement slurries of the invention, although water containing concentrations of sodium chloride more than about 1 percent by weight should be avoided, as higher concentrations tend to destroy the fluid loss properties of the slurry. The slurries of the invention can be formed through the use of conventional techniques and apparatus normally employed in well cementing operations, such as, for example, by either jet mixing or batch mixing.

In addition to the foregoing primary ingredients, other optional components can also be employed in the cement slurries of the invention where their use is desirable for a particular application. For example, minor amounts of a retarder, accelerator, and/or defoamer can also be desirable for use in particular situations, as will be recognized by those of ordinary skill in the art.

A retarder is frequently used where the bottom hole circulating temperature exceeds about 150° F. (65° C.). Retarders satisfactory for use in the invention include those commercially available products commonly employed as retarders in cement slurries which comprise zinc salts, and preferably, zinc borate. One such retarder that has proven satisfactory for use with the slurries disclosed herein is marketed under the tradename WR-10 by The Western Company of North America. The amount of retarder required will vary according to the bottom hole circulating temperature, the concentration of fluid loss additive within the slurry, and variations in the makeup of the cement itself. The proper amount of retarder (or accelerator) required in any given case should be determined by running a "thickening time" test for the particular concentration of fluid loss additive and type of cement being used. Such tests should be run according to the procedures set forth in API RP-10B. Generally speaking, "thickening time" is defined in API RP-10B as the elapsed time from the time pumping begins until the cement reaches from about 70 to about 100 units of consistency. In most applications, the amount of retarder, if any, required will not exceed more than about 0.4 percent by weight of the cement. It should be noted that lignosulfonate retarders are incompatible with the fluid loss additive of the invention, and should not be employed therewith.

The fluid loss additive of the invention has a slight retarding effect in itself, and seems to enhance the performance of the retarder. As a result, less retarder is necessary than might otherwise be required. This retarding effect is believed to result from the action of the dispersant and is more pronounced at lower temperatures, necessitating the use of an accelerator at the lower temperature ranges.

Where the bottom hole circulating temperature is less than about 150° F. (65° C.) the use of an accelerator may be desirable. A preferred accelerator for use in the subject slurries is potassium chloride. Satisfactory results have been achieved where the potassium chloride is employed in amounts up to about 6 percent by weight of the water contained in the slurry.

The optional use of a defoamer is also within the scope of the invention. The defoamer is preferably employed in an amount ranging from about 0.1 to about 0.3 percent weight of the cement, and can be selected from any of the commercially available defoamers commonly used in cement slurries. Defoamers that have proven satisfactory in the slurries of the present invention include FOAMASTER A and PD-1, marketed by Diamond Shamrock Corporation, and Nalco 3801, marketed by Nalco Chemicals, Inc.

Where the static bottom hole temperature exceeds about 240° F. (116° C.), it can also be desirable to include from about 20 to about 50 percent silica sand, by weight of the cement, in the slurries of the invention to prevent strength retrogression. At static bottom hole temperatures over 240° F. (116° C.), the strength of the cement will decrease after a period of time unless sand is present.

The correlation between static bottom hole temperature and bottom hole circulating temperature can be determined by reference to API RP-10B. As a practical matter, a static bottom hole temperature over about 240° F. (116° C.) can be experienced where the bottom hole circulating temperature is as low as about 160° F. (71° C.).

The following examples are set forth in order to more fully describe the significantly improved properties of the cement slurries of the invention.

EXAMPLE 1

Three slurries were prepared by blending Portland cement and 1.0, 1.25 and 1.5 percent fluid loss additive, respectively, together with 46 percent water, all by weight of the cement. The fluid loss additive comprised about 50 weight percent polyvinylpyrrolidone (PVP K-30), 40.9 weight percent dispersant (TF-4), and 9.1 weight percent carboxymethylhydroxyethyl cellulose (SPX-5323). Each of the three slurries was then divided into three parts for testing at different temperatures. Three additional slurries comprising 0.75 percent fluid loss additive, by weight of the cement, were also prepared as above, but containing minor amounts of zinc borate retarder, as shown in Tables 1 and 2 below. Thickening time and early compressive strength tests were then run on the slurries at different temperatures, following the procedures set forth in API RP-10B. The results of the tests are tabulated in Tables 1 and 2.

TABLE 1

| | THICKENING TIME | | |
|---|---|---|---|
| Temperature °F. (1.5 gradient)* | Fluid Loss Additive (wt. %) | Retarder (wt. %) | Thickening Time (hr:min) |
| 165 | 0.75 | 0.05 | 2:48 |
| 165 | 1.00 | — | 3:08 |
| 165 | 1.25 | — | 3:31 |
| 165 | 1.50 | — | 4:13 |
| 180 | 0.75 | 0.05 | 3:02 |
| 180 | 1.00 | — | 3:15 |
| 180 | 1.25 | — | 3:18 |
| 180 | 1.50 | — | 3:48 |
| 195 | 0.75 | 0.1 | 3:42 |
| 195 | 1.00 | — | 3:39 |
| 195 | 1.25 | — | 3:47 |
| 195 | 1.50 | — | 4:04 |

TABLE 2

| | COMPRESSIVE STRENGTH | | | |
|---|---|---|---|---|
| Temperature °F. (1.5 gradient) | Fluid Loss Additive (wt. %) | Retarder (wt. %) | Compressive Strength* (psi) | |
| | | | 8 hours | 24 hours |
| 165 | 0.75 | 0.05 | 2120 | 3723 |
| 165 | 1.00 | — | 2282 | 3714 |
| 165 | 1.25 | — | 2051 | 3719 |
| 165 | 1.50 | — | 1788 | 3981 |
| 180 | 0.75 | 0.05 | 2204 | 3782 |
| 180 | 1.00 | — | 2216 | 3416 |
| 180 | 1.25 | — | 2314 | 3494 |
| 180 | 1.50 | — | 2419 | 4100 |
| 195 | 0.95 | 0.1 | 2218 | 4208 |
| 195 | 1.00 | — | 2268 | 3614 |
| 195 | 1.25 | — | 2254 | 3718 |
| 195 | 1.50 | — | 2019 | 3828 |

*In order to show the high early compressive strength properties of the additive, the compressive strengths were run at circulating temperature.

EXAMPLE 2

Fluid loss values for the slurries prepared according to Example 1 were determined according to the procedures set forth in API RP-10B for three different temperatures, as before. The data thus obtained is graphed in FIG. 1. FIG. 1 demonstrates the decrease in fluid loss achieved with increasing concentrations of additive at various constant temperatures. An acceptable level of fluid loss control, depending on the particular situation, is preferably not more than about 200 ml/30 minutes. FIG. 1 shows that the subject additive was effective at temperatures up to and above 200° F. (93° C.) for concentrations falling within the most preferred range (1.0-1.5%).

EXAMPLE 3

Slurries were again prepared by blending Portland cement, fluid loss additive and water, as set forth in Example 1. Minor amounts of retarder were also added as indicated below. In this case, however, the cement further included about 35 percent sand, by weight of the cement. Thickening time and compressive strength tests were again run according to API RP-10B, but for four different temperatures. The results are tabulated in Tables 3 and 4.

TABLE 3

| | THICKENING TIME | | |
|---|---|---|---|
| Temperature °F. (1.5 gradient) | Fluid Loss Additive (wt. %) | Retarder (wt. %) | Thickening Time (hr:min) |
| 165 | 0.75 | 0.10 | 3:12 |
| 165 | 1.00 | 0 | 3:01 |
| 165 | 1.25 | 0 | 3:09 |
| 165 | 1.50 | 0 | 3:52 |
| 180 | 0.75 | 0.10 | 2:56 |
| 180 | 1.00 | 0.10 | 3:12 |
| 180 | 1.25 | 0 | 3:21 |
| 180 | 1.50 | 0 | 3:32 |
| 195 | 0.75 | 0.15 | 4:20 |
| 195 | 1.00 | 0.15 | 4:14 |
| 195 | 1.25 | 0.10 | 4:38 |
| 195 | 1.50 | 0.10 | 4:55 |
| 210 | 1.00 | 0.15 | 4:41 |
| 210 | 1.25 | 0.10 | 4:19 |
| 210 | 1.50 | 0.10 | 4:47 |

TABLE 4

| | COMPRESSIVE STRENGTHS | | | |
|---|---|---|---|---|
| Temperature °F. (1.5 gradient) | Fluid Loss Additive (wt. %) | Retarder (wt. %) | Compressive Strength* (psi) | |
| | | | 8 hours | 24 hours |
| 165 | 0.75 | 0.10 | 1781 | 3007 |
| 165 | 1.00 | 0 | 1323 | 2467 |
| 165 | 1.25 | 0 | 1394 | 2497 |
| 165 | 1.50 | 0 | 1658 | 3083 |
| 180 | 0.75 | 0.10 | 1904 | 3102 |
| 180 | 1.00 | 0.10 | 1968 | 2814 |
| 180 | 1.25 | 0 | 1917 | 2918 |
| 180 | 1.50 | 0 | 1928 | 3040 |
| 195 | 0.75 | 0.15 | 1954 | 2937 |
| 195 | 1.00 | 0.15 | 1962 | 2956 |
| 195 | 1.25 | 0.10 | 1968 | 3403 |
| 195 | 1.50 | 0.10 | 2114 | 3489 |
| 210 | 1.00 | 0.15 | 2416 | 3286 |
| 210 | 1.25 | 0.10 | 2618 | 3442 |
| 210 | 1.50 | 0.10 | 2753 | 4218 |

*In order to show the high early compressive strength properties of the additive, the compressive strengths were run at circulating temperature.

EXAMPLE 4

Figure 2:
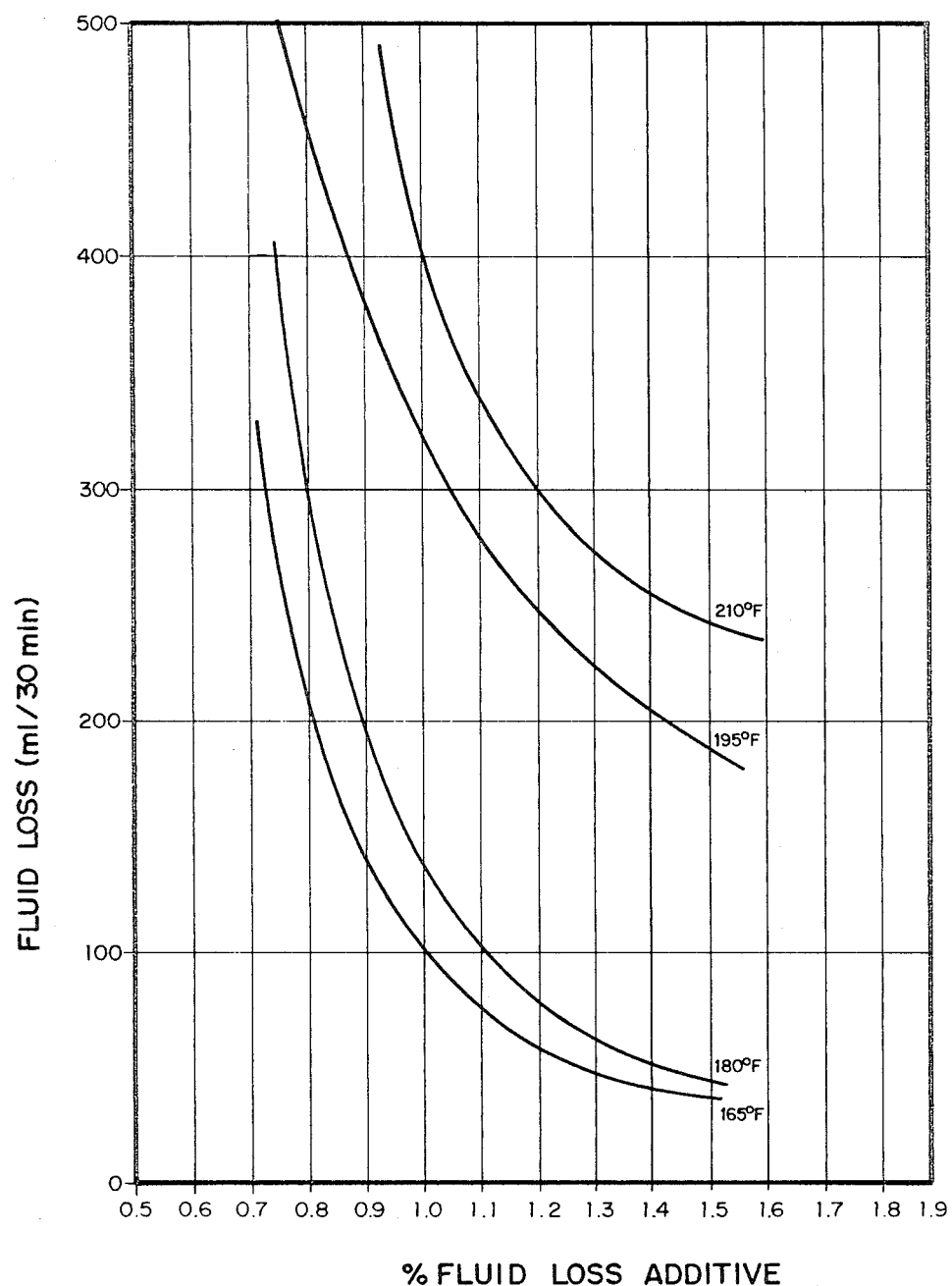
FIG. 2 demonstrates a decrease in fluid loss achieved with increased fluid loss additive concentrations at various temperatures.

Fluid loss values for the slurries prepared according to Example 3 were determined according to the procedures set forth in API RP-10B for the four different temperatures, as before. The data thus obtained is graphed in FIG. 2. FIG. 2 again demonstrates the decrease in fluid loss achieved with increased fluid loss additive concentrations at various temperatures. However, because the slurries of Example 3 contained sand, the fluid loss for a given concentration is slightly higher than the values previously shown in FIG. 1. This is believed to result from the fact that the sand makes the filter cake somewhat more permeable than it would otherwise be.

Figure 3:
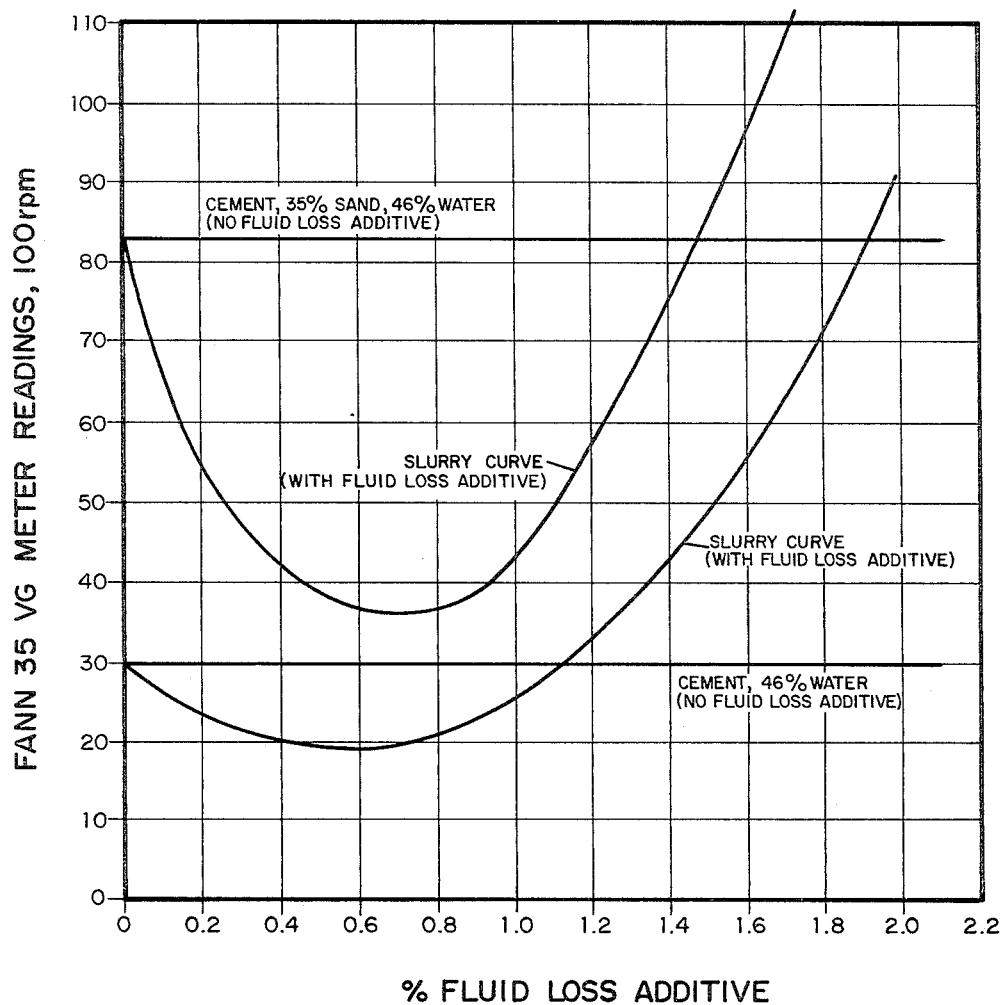
FIG. 3 depicts the relationship between a viscosity related variable and the concentration of fluid loss additive for the slurries of Examples 1 and 3.

As previously stated, the improved slurries disclosed herein provide excellent fluid loss control while maintaining slurry viscosities at levels comparable to those of the neat slurries (containing no fluid loss additive). FIG. 3 depicts the relationship between a viscosity related variable and the concentration of fluid loss additive for the slurries of Examples 1 and 3. The behavior of the respective neat slurries is also shown as a reference. Because of their lower viscosities, the improved slurries can be pumped faster than traditional slurries containing fluid loss additives, without seriously increasing well bore pressures. They are effective for cementing casing across weak, sensitive zones where fluid loss must be controlled, and can also be used across lost circulation zones, or for squeeze cementing.

While this invention has been described in relation to its preferred embodiments, it is to be understood that various modifications thereof will be apparent to those of ordinary skill in the art upon reading the specification. It is intended to cover all such modifications as fall within the scope of the appended claims.

What is claimed is:

1. In a method for cementing a subterranean well bore wherein a cement slurry is pumped downwardly through the well bore within the well casing, out through the open lower end of the casing, then upwardly in the annulus between the well casing and the wall of the well bore, the improvement consisting of utilizing a cement slurry comprising cement, from about 26 to about 60 percent water, and from about 0.75 to about 2 weight percent fluid loss additive, by weight of the cement, wherein said fluid loss additive further comprises from about 30 to about 70 weight percent polyvinylpyrrolidone, from about 5 to about 19 weight percent carboxymethylhydroxyethyl cellulose, and the sodium salt of naphthalene sulfonate.

2. The improved method of claim 1 wherein said slurry comprises from about 38 to about 48 percent water, by weight of the cement.

3. The improved method of claim 2 wherein said slurry comprises from about 1 to about 1.5 percent fluid loss additive, by weight of the cement.

4. The improved method of claim 1, 2 or 3 wherein said cement is Portland cement.

5. The improved method of claim 1, 2 or 3 wherein said cement is a mixture of Portland cement and lightweight cement.

6. The improved method of claim 1, 2 or 3 wherein said slurry further comprises a retarder.

7. The improved slurry of claim 6 wherein said retarder is zinc borate.

8. The improved method of claim 7 wherein said retarder is present in an amount ranging up to about 0.4 percent by weight of the cement.

9. The improved method of claim 1, 2 or 3 wherein said slurry further comprises an accelerator.

10. The improved method of claim 9 wherein said accelerator is present in an amount ranging up to about 6 percent by weight of the water in said slurry.

11. The improved method of claim 9 wherein said accelerator is potassium chloride.

12. The improved method of claim 1, 2 or 3 wherein said slurry further comprises a defoamer.

13. The improved method of claim 12 wherein said defoamer is present in an amount ranging from about 0.1 to about 0.3 percent by weight of the cement.

14. The improved method of claim 1, 2 or 3 wherein said slurry further comprises from about 20 to about 50 percent sand, by weight of the cement.

* * * * *

UNITED STATES PATENT AND TRADEMARK OFFICE
CERTIFICATE OF CORRECTION

PATENT NO. : 4,258,790
DATED : March 31, 1981
INVENTOR(S) : Billy W. Hale

It is certified that error appears in the above—identified patent and that said Letters Patent are hereby corrected as shown below:

Column 4, line 35, change "percent weight" to --percent by weight--.

Column 5, line 26, add --*1.5°F per 100 feet of depth--.

Signed and Sealed this

Seventeenth Day of November 1981

[SEAL]

Attest:

GERALD J. MOSSINGHOFF

Attesting Officer     Commissioner of Patents and Trademarks